Aug. 13, 1935.　　　　F. METZ　　　　2,011,413
RUST AND SCALE REMOVING IMPLEMENT
Filed May 22, 1933
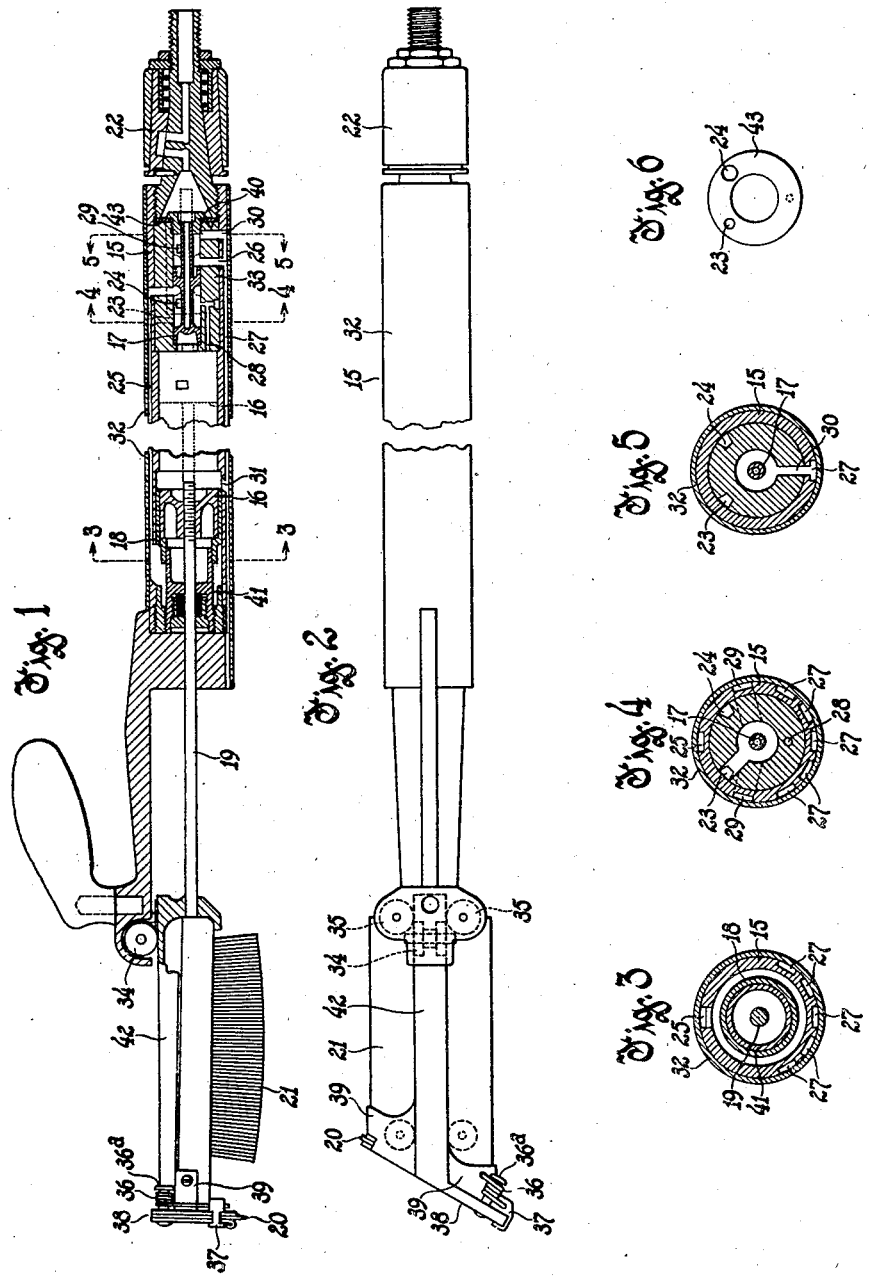
Inventor
Fritz Metz
By Arthur Simon
Attorney Patented Aug. 13, 1935

2,011,413

UNITED STATES PATENT OFFICE 2,011,413

RUST AND SCALE REMOVING IMPLEMENT

Fritz Metz, Merseburg, Germany

Application May 22, 1933, Serial No. 672,095
In Germany November 11, 1932

4 Claims. (Cl. 15—22)

The rust and scale removing implements which were used heretofore for the cleaning of iron surfaces and the like are provided either with a rotating or with an impact tool.

The rotating tools have the disadvantage that they put a tiring strain on the operator since he has to oppose the tendency of the tool to roll back from the surface against which it is applied.

Another disadvantage of the rotating tools is that the operator or the persons standing nearby are endangered by particles which fall off the work. Moreover, it is difficult to use such implements in narrow and confined spaces.

Implements of the impact or hammer-type have the disadvantage that the working surface, which is to be cleaned, is roughened by such cleaning with the consequence that the resultant sharp ridges and edges pierce the subsequently applied coat of paint or reduce the local thickness of such coat and thus favor the renewed formation of rust.

Another disadvantage of these tools is that they merely peel the layer of rust off the surface, while the rust in the depressions of the corroded part is not removed.

An object of the present invention is to provide a rust and scale removing implement, which not only removes the rust from the surface, but also from the depressions of the corroded parts.

Another object is to provide an implement, the operation of which does not unduly tire the operator.

Another object is to provide an implement which does not endanger the operator or other persons from flying fragments of rust or other particles.

Another object is to provide an implement which is adapted to be used in narrow and confined spaces and on confined parts of the work.

Another object is to provide an implement by which the dust rising from the work is immediately dispersed by the escaping air.

Another object is to provide an implement which will start immediately upon the supply of the motive power.

Another object is to supply an implement, the power and speed of which, may be regulated and adjusted within wide limits.

Another object is to provide an implement which may be used alternately or simultaneously as a brush and a scraper.

Other objects and advantages of the invention will hereinafter appear.

The invention in its broader aspect resides in an implement for cleaning surfaces from adhering rust and the like by scraping and/or brushing, the implement being provided with a scraper and a brush, arranged to enable either individual or joint application to the working surface and means for reciprocating said scraper and brush.

From another aspect the invention resides in an implement as aforedescribed which is equipped with cleaning elements which are easily removed and exchanged.

In the accompanying drawing,

Figure 1 is a diagrammatic drawing in section of the principal parts of the rust and scale removing implement.

Fig. 2 is a plan view of the implement.

Fig. 3 is a section along the lines 3—3 of Fig. 1.

Fig. 4 is a sectional view along the lines 4—4 of Fig. 1.

Fig. 5 is a sectional view along the lines 5—5 of Fig. 1.

Fig. 6 is a top view of part 43 of Fig. 1.

Referring to the drawing, a cylinder 15 is provided with a piston 16, the latter being adapted to be reciprocated in the cylinder by compressed air. The admission and the exhaust of the air is regulated by reversing valves 17 and 18 arranged, respectively, at the two ends of said cylinder and concentric therewith. Attached to the piston is a piston rod 19 which extends through the valve 18 and thence through a combined guide and stuffing box 41 for the valve 18. The outer end of the piston rod is provided with a suitable tool holder which supports a scraper 20 and a brush 21, as will be more fully explained hereinafter.

The cylinder 15 is provided with an outer jacket 32 which forms the stock or body of the appliance. The end of the stock adjacent to the valve 17 is equipped with a regulating valve 22 for the admission of the operating air. The stationary part of said valve is screwed into the end of the cylinder and is equipped at its extreme end with a conventional screw nipple. The valve 22 may be of any conventional rotating type, as indicated, for example, in Figs. 1 and 2. By rotating the outer ferrule of said valve, the air supplied to the nipple may be conducted to or shut off from the interior of the appliance.

The valve 17 is of the piston type, having in its central part an annular groove between two shoulders which latter closely fit the bore of a valve seat 33. The valve seat 33 is shrunk into the end of the cylinder 15 adjacent to the screwed part of valve 22 and is provided with a number of passages for controlling the flow of air as will be more fully explained. The outer end of the valve bore is threaded to receive a nut 40 which limits the outward stroke of the valve and which holds in place a washer 43 illustrated in detail in Fig. 6. By unscrewing the nut, the washer, as well as the valve body 17, may be readily exchanged for another washer and valve, respectively. The inward stroke of the valve 17 is limited by a shoulder in the bore of the valve seat 33.

An air passage 23 leads from the inner chamber of valve 22 through the washer 43 and the valve body into the bore for the valve 17. A second air passage 24 also extends through the washer 43 and the valve seat 33 to the bore for the valve 17, terminating therein so that it is closed when the valve 17 is in its extreme outer position. A passage 25 leads from the valve bore to the opposite end of the cylinder and the valve 18. Passages 26 and 30 lead from the bore of the valve 17 to several parallel passages 27 which terminate at the end of the cylinder adjacent to the tool holder. A passage 28 leads from the bore of the valve 17 directly into the adjacent end of the cylinder, and a passage 29 leads from the cylinder bore to the bore of the valve 17, as indicated in the drawing.

The valve 18 consists essentially of two cylinders of different diameters. The outer, smaller cylinder may slide over the inner end of guide 41. The larger portion of valve 18 is arranged to slide for some distance into a recessed portion at the end of the cylinder 15, while the inside diameter of such portion is of the same diameter as the piston 16 so that upon moving towards the valve 18 the piston slides into the valve and finally slides the latter towards the end of the cylinder. As the piston moves away from said end, the valve 18 moves with the former, due to the air pressure, until arrested by abutment against the shoulder of the recess referred to, whereupon the piston may continue to slide while the valve 18 stands still.

Near the end of the cylinder, adjacent to the valve 18, several passages 31 are cut into the cylinder wall, which passages communicate with the passage 27 to conduct the air exhausted from the cylinder to the outside.

The compressed air motor operates as follows: Let it be assumed that the valve 17 is in the position shown in dotted lines in Fig. 1, while valve 18 and piston 16 are in the position shown in Fig. 1. On turning the rotary valve 22, compressed air is admitted to the throttle disk 43 and it also impinges upon the area of the valve 17 which projects through the valve nut 40. The pressure on the valve moves it inwardly to the position shown in full lines. As the valve 17 moves inwardly it first uncovers the passage 24 and then the passage 23 and thus air passes first through the passage 24 and later also through passage 23 in the throttle disk 43 and the valve body 33 to the annular groove between the two shoulders of the slide valve 17. From here the air passes through the passage 25 to the slide valve 18. The pressure of the air against the outer surface of the slide valve pushes it against the piston 16 and both move inwardly. During such movement the valve 18 leaves the guide 41 and closes the exhaust ports 31 and simultaneously admits air directly into the cylinder through an opening between the valve 18 and the valve guide 41. The valve 18 ultimately comes to a stop against the shoulder of the annular recess in the end of the cylinder 15 as explained heretofore. The air supplied through the passage 25 now continues to act upon the piston 16 and moves the latter to its extreme right position, while the air in front of the piston escapes through the conduits 29, 26 and 27. Shortly before reaching the extreme right hand position, the piston 16 closes the conduit 29 and through its further movement compresses the air which is thus trapped in the right hand end of the cylinder. The increasing pressure of this trapped air acts upon full diameter of the valve 17 in opposition to the air pressure upon the extension extending into nut 40 and ultimately moves the valve towards the position shown in dotted lines.

With the valve 17 moving towards its extreme outer position, compressed air is caused to pass through the throttle disk 43 and passage 23 into the space enclosed by the piston 16 and the slide valve 17, thus causing reversal of the piston, and, if it is not yet completed, completing the stroke of the valve 17 to the right. Since the passage 29 is closed by the slide valve 17, the compressed air supplied to the cylinder to the right of the piston 16 cannot escape. The air in the cylinder to the left of the piston is exhausted through passages 25, 26 and 27. As the piston 16 approaches its extreme left position, it engages the valve 18 with it and returns the latter again to its extreme outer position, as shown in full lines.

As soon as the piston 16 has travelled to the left beyond the exhaust passages 31, the pressure in the right hand side of the cylinder suddenly decreases because the air supplied thereto is throttled in the passage 23 which is substantially smaller than the exhaust ports 31. Therefore a differential pressure is exerted upon the valve 17, the one component being due to the reduced pressure of the air in the cylinder 15 and the other being the full supply pressure exerted upon the projection of the valve 17 which passes through the nut 40. The latter pressure ultimately predominates and thereby moves the valve 17 towards the left. This initiates the next stroke as described heretofore and the motor continues to reciprocate forth and back as long as the valve 22 is open.

If, upon initial admission of air through the valve 22, the piston 16 should accidentally be in the extreme right position, as shown in dotted lines, while the right hand valve 17 is in its inner extreme position, fresh air flows through the passage 23, the annular recess of the valve 17 and the passage 28 into the space enclosed by the piston 16 and the valve 17. The pressure thus exerted on the valve 17 immediately moves it toward its extreme outer position. As soon as the passage 23 is uncovered by the movement of the valve 17 to the right, supply air passes directly from passage 23 to the space between the piston 16 and the slide valve 17 and forces the piston towards the left and the slide valve to the right. The conduit 29 being closed by the slide valve 17, the air thus supplied to the cylinder cannot escape and the piston is moved, as explained heretofore.

The reciprocatory speed of the device may be varied by varying the bores in the throttle disk 43 which are in alignment with the passage 23 and 24, thereby increasing or decreasing the effective air pressure in the cylinder and thus the speed of reversal. Furthermore, the speed of response of the valve 17 may be varied by varying the ratio between the maximum diameter, which is subjected to an air pressure tending to move this valve to the right, and the diameter of the projection passing through the nut 40, which is subjected to an air pressure tending to move the valve to the left. The response of the valve may also be varied by varying its weight. It is thus possible, by exchanging the valve 17 for another valve of different proportions, to vary the speed of operation of the device. This arrangement makes it possible to vary the speed or frequency of reciprocation of the appliance within very wide limit and to adjust it for different operations and for different supply pressures. To remove the valve 17, it is only necesary to unscrew the head 22 and the nut 40.

The tool holder which is formed at the outer end of the piston rod 19 has a forward extension 38. A slot is provided in the extension 38 for receiving the blade 20, the blade being inserted in the slot from below. A clamp or pin 37 is arranged to be urged into a corresponding recess on one side edge of the scraper blade. The pin 37 is urged into engagement by a spring 36 which is supported on the tool holder by a pin 36ª. The blade is preferably made of high speed steel.

The scraper blade is preferably mounted so as to be approximately at right angle to the working surface and at an acute angle with the direction of the reciprocating motion as seen from above. This mounting prevents scoring of the working surface and facilitates removal of the loosened material away from the blade.

The tool holder is also provided with two lateral flanges 39, one at each side of its center line, which serve for the retaining and fastening of a wire brush 21 which extends laterally behind the scraper 20.

The scraper blade and the brush may be fastened in other ways from those indicated in the drawing and the tool holder may be suitably modified for such purpose.

The working surface of the brush preferably forms a surface which is curved in the direction of the reciprocating motion and the working edge of the scraper is preferably arranged to be located approximately on the same curved surface.

The stock of the tool has a forward extension which carries a vertical roller 34 and two horizontal rollers 35 which engage a rib 42 of the tool holder to prevent it from turning, and which transmit the forces acting thereon upon the stock.

To operate the implement it is gripped by both hands of the operator and pressed with its cleaning elements against the working surface. By turning the valve 22, the desired quantity of air is delivered to the cylinder, whereupon the piston reciprocates. By tilting the implement at different angles with respect to the working surface, either the scraper or the brush alone or both simultaneously may be brought into action on the working surface.

As will be seen, the exhaust air from the air cylinder is conducted through the conduits 27 in the direction of and near to the scraper and brush and thus serve to remove the dust loosened thereby from the working surface and away from the operator. At the same time the dust is prevented from clogging the scraper and brush, thus keeping them in proper working condition.

What I claim as new and desire to secure by Letters Patent is:

1. An implement for cleaning surfaces and adapted for manual support comprising, in combination, an elongated tubular handle, a reciprocatory motor arranged inside of said handle and having a piston arranged to reciprocate substantially the full length of said handle, a piston rod attached to said piston and extending axially outside of one end of said handle and a surface treating implement attached to said piston rod substantially at its outer end and substantially in alignment therewith.

2. An implement for cleaning surfaces and adapted for manual support comprising, in combination, an elongated tubular handle, a reciprocatory air motor arranged inside of said handle and having a piston arranged to reciprocate substantially the full length of said handle, a piston rod attached to said piston and extending axially outside of one end of said handle, a surface treating implement attached to said piston rod substantially at its outer end and substantially in alignment therewith and an exhaust duct for said motor which terminates at said one end of said handle and which is adapted to direct the exhaust air of said motor towards said implement.

3. An implement for cleaning surfaces and adapted for manual support comprising, in combination, an elongated tubular handle, a reciprocatory motor arranged inside of said handle and having a piston arranged to reciprocate substantially the full length of said handle, a piston rod attached to said piston and extending axially outside of one end of said handle, a surface treating implement attached to said piston rod substantially at its outer end and substantially in alignment therewith, and means located at the other end of said handle and adapted to conduct a supply of energy to said motor, said last mentioned means including an operating sleeve coaxial with said handle and adapted to control the supply of said energy to said motor.

4. An implement for cleaning surfaces and adapted for manual support comprising, in combination, an elongated tubular handle, a reciprocatory motor arranged inside of said handle and having a piston arranged to reciprocate substantially the full length of said handle, a piston rod attached to said piston and extending axially outside of one end of said handle, a surface treating implement attached to said piston rod substantially at its outer end and substantially in alignment therewith, an exhaust duct for said motor which terminates at said one end of said handle and which is adapted to direct the exhaust air of said motor towards said implement and means located at the other end of said handle and adapted to conduct air under pressure to said motor, said last mentioned means including an operating sleeve coaxial with said handle adapted to control the air supplied to said motor.

FRITZ METZ.